No. 641,703. Patented Jan. 23, 1900.
J. J. KIZLER.
LEMON SQUEEZER.
(Application filed May 23, 1899.)

(No Model.)

Witnesses

Inventor
John J. Kizler

UNITED STATES PATENT OFFICE.

JOHN J. KIZLER, OF HILLSBOROUGH, KANSAS.

LEMON-SQUEEZER.

SPECIFICATION forming part of Letters Patent No. 641,703, dated January 23, 1900.

Application filed May 23, 1899. Serial No. 717,929. (No model.)

*To all whom it may concern:*

Be it known that I, JOHN J. KIZLER, a citizen of the United States, residing at Hillsborough, in the county of Marion and State of Kansas, have invented certain new and useful Improvements in Lemon-Squeezers; and I do hereby declare the following to be a full, clear, and exact description of the invention, such as will enable others skilled in the art to which it appertains to make and use the same.

This invention relates to means for extracting juices from lemons, limes, and analogous fruits having a thick and tough skin.

The vital feature of the invention is a spiral constructed of relatively stout or heavy wire and adapted to receive one half of the lemon or fruit to be operated upon and coöperate with an extractor of conoidal or like form provided with fluted or ribbed sides.

For a full understanding of the merits, advantages, and details of construction of the invention reference is to be had to the following description and drawings hereto attached.

The wire from which the device is constructed must be heavy and stout in order to withstand the strain, three-sixteenths of an inch in diameter being about the usual gage of the wire employed. After the volutes of the wire have taken hold of the fruit by becoming partially embedded in the skin a further rotation of the device will tend only to embed the volutes still deeper into the skin of the fruit, whereas a simultaneous inward pressure upon the handle 4 will compress the fruit and force it upon the extractor 6 and insure a thorough expressing of all the juice and removal of the pulp.

Figure 1:
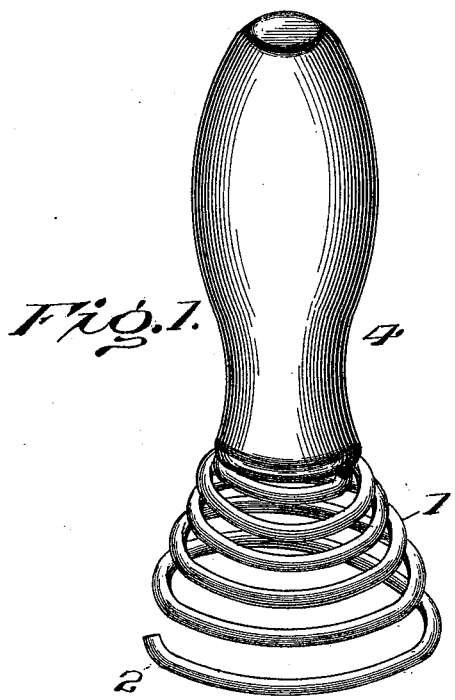
Figure 2:
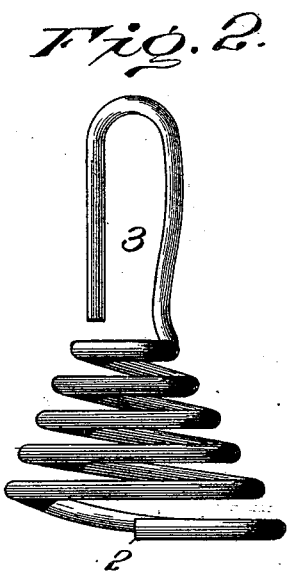
Figure 3:
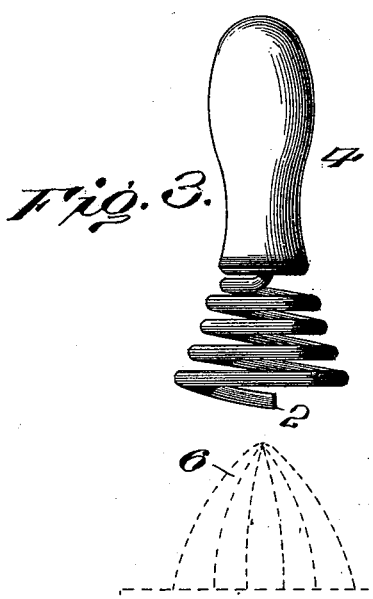

Referring to the drawings forming a part of the specification, Figure 1 is a perspective view of the device. Fig. 2 is a side elevation, the handle being omitted. Fig. 3 is a detail view showing the application of the invention.

Corresponding and like parts are referred to in the following description and indicated in all the views of the drawings by the same reference characters.

The combined squeezer and holder consists of a spiral 1 of approximately conoidal shape and formed of a length of relatively stout or heavy spring-wire, either galvanized, tinned, or otherwise rendered proof against corrosive action of fruit-juices and moisture. The terminal portion of the base volute is deflected, as shown at 2, so as not to be in the way and to bring the major portion of said volute in the same plane to embrace the edge portion of the lemon and prevent its splitting. The opposite end portion of the wire is bent into a loop 3, axially disposed and adapted to be gripped or to be fitted into a handle 4, as desired.

The device constructed as specified is adapted for use in connection with extractors of the type shown at 6, on which the lemon when halved is rotated, the side ribs or projections expressing the juice. In accordance with this invention the lemon when cut in two has one half placed within the hollow of the spiral 1, after which the handles of the devices 1 and 6 are grasped in opposite hands and manipulated to bring the lemon over the point of the extractor 6 in the usual manner. The spiral, being turned, conforms to the size of the lemon, grips it securely, and at the same time contracts axially and diametrically, thereby forcing the lemon upon the extractor 6 with great pressure and insuring the expressing of all juice. Every part of the lemon is subjected to a like pressure, and the spiral cannot slip, because the volutes become partially embedded in the skin of the fruit, and the greater the degree of force expended to turn the spiral the more will be the tendency of its volutes to grip the lemon, as by a combined wedging and screw action.

It is highly important that the wire from which the extractor is constructed be heavy, stout, or of relatively large gage, three-sixteenths of an inch or thereabout being the usual size, in order to provide a device possessing stable qualities and sufficient rigidity to withstand the torsional and axial strain and pressure to which it will be subjected without collapsing and getting out of shape.

Having thus described the invention, what is claimed as new is—

As an improved article of manufacture, a fruit-juice extractor constructed of relatively stout or heavy spring-wire bent into the form of a cone, the elements being spaced and having a spiral disposition, and a handle at the smaller end of the cone to be grasped when steadying and relatively turning the extractor, substantially as set forth.

In testimony whereof I affix my signature in presence of two witnesses.

JOHN J. KIZLER. [L. S.]

Witnesses:
H. B. KLIEWER,
S. L. ARMSTRONG.